April 8, 1941.                         C. L. JONES                              2,237,739
                            METHOD OF PROCESSING FOOD PRODUCTS
                                     Filed July 27, 1939
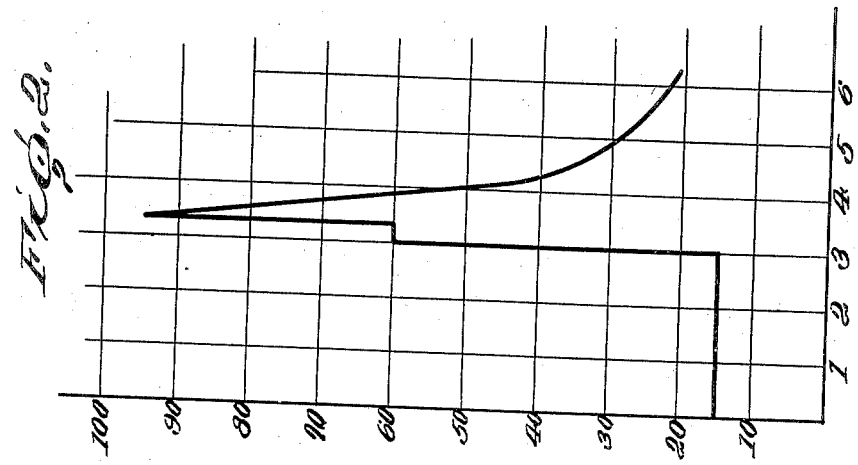
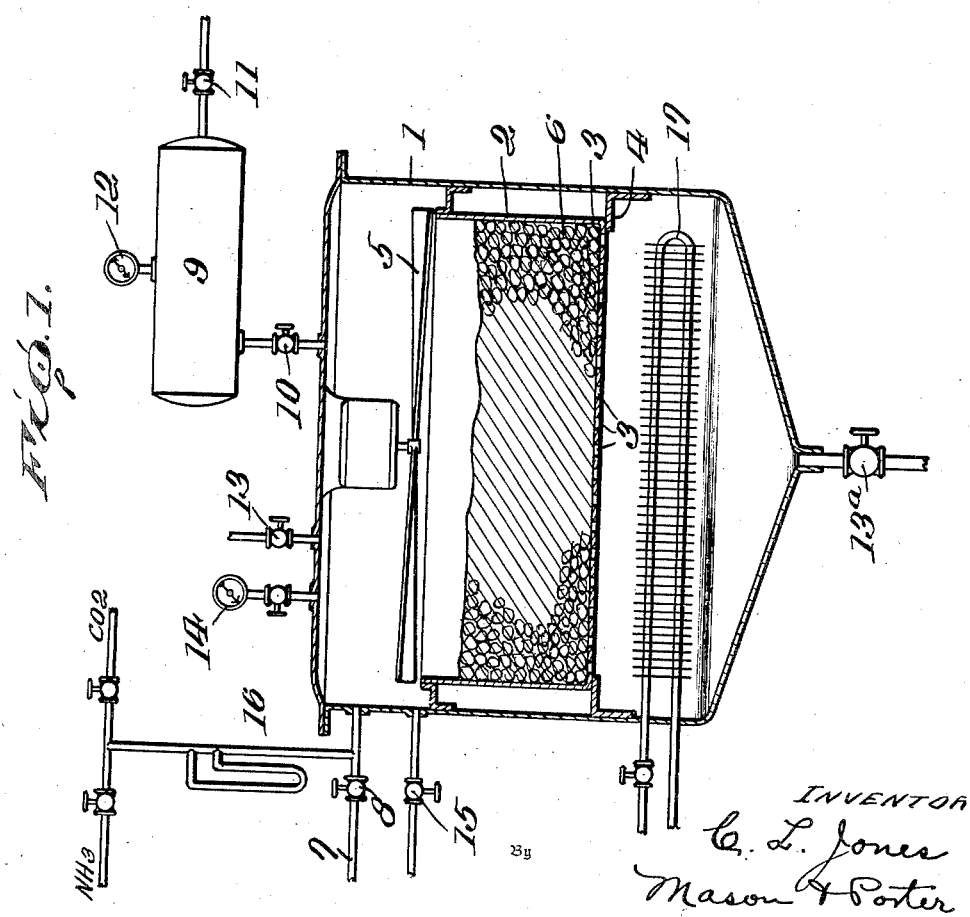
INVENTOR
C. L. Jones
Mason & Porter
ATTORNEYS Patented Apr. 8, 1941

2,237,739

UNITED STATES PATENT OFFICE 2,237,739

METHOD OF PROCESSING FOOD PRODUCTS

Charles L. Jones, Chicago, Ill., assignor to Continental Can Company, Inc., New York, N. Y., a corporation of New York Application July 27, 1939, Serial No. 286,906

7 Claims. (Cl. 99—211)

The invention relates in general to a method of sterilizing food products by means of heat, and more particularly to a method of sterilizing wherein the food product is heated to a comparatively high temperature for a short period of time, which method is commonly referred to as a "high-short" method.

An object of the invention is to provide a method by which food products of delicate structure which are easily injured by drastic methods may be effectively sterilized in a "high-short" sterilization without any injury occurring.

A further object of the invention is to provide a method whereby the cooling of the food product may be accomplished at a maximum rate without leaching out flavors, minerals, sugar, or other desirable soluble constituents.

A still further object of the invention is to provide a method whereby the acidity or alkalinity of a food product may be controlled or altered at will during processing, and without disturbing the mass under treatment, or injuring the structure in any way.

These and other objects will in part be obvious and will in part be hereinafter more fully described.

It is believed that the method will be better understood by reference to an apparatus which may be used in the carrying out of the same, although the apparatus per se forms no part of the present invention.

In the drawing—

Figure 1 is a diagrammatic illustration of an apparatus for carrying out the invention;

Fig. 2 is a diagram showing a cycle of sterilization followed in the treating of peas.

The apparatus includes a pressure vessel indicated at 1 which may be of any conventional type suitable for safely sustaining the pressures required in the carrying out of the method. This pressure vessel is adapted to receive a charge of the material for treatment, either receiving and delivering intermittently batches of material, or receiving a basket or unit containing the product to be treated.

In the drawing, an inner container 2 is shown in which the material to be treated rests substantially without agitation during the entire time of treatment. This container is shown as having a perforated bottom 3 to permit the passage of gases through the food product mass. The entire container rests on a supporting channel member 4 which not only serves as a support for the container, but at the same time prevents the short-circuiting of steam and gases around the basket, compelling them to travel through the product under treatment.

A fan 5 is preferably positioned above the product being treated to accelerate the passage of gases downwardly through the material under treatment. The material is indicated at 6 in the drawing. The food product to be treated may be any discrete particle of food, such as peas, diced vegetables, whole grain corn, and the like. Food products which are not so clearly discrete, such as shrimp and the like, may be treated by providing suitable supports to facilitate the passage of air and gases through the material under treatment, as by the use of a plurality of screen trays.

Steam is supplied from a line 7 controlled by the valve 8. Air or an inert gas is introduced into the vessel under pressure from a storage tank 9, the contents of which may be equalized with the pressure vessel 1 by means of the valve 10. The storage tank is supplied with air or other gas under pressure through the valve 11, and may be gauged as to its contents by a knowledge of its volume and the readings of the pressure gauge 12.

The treating vessel is also provided with vents 13, 13a to the atmosphere, a suitable pressure gauge 14 and a connection 15 to a vacuum pump, by means of which the vessel may be evacuated in certain cases where this is desirable.

A connection 16 is also shown through which acidic or basic gases may be introduced into the vessel at a controlled rate of flow. For convenience, this has been shown as feeding into the steam supply line, but under certain conditions, it may be desirable to introduce such gases at a later stage in the treatment, along with air or inert gas used in cooling the product, in which case the gases would be introduced into the storage tank 9 or the pipe line leading therefrom to the vessel. A cooling coil preferably finned, through which cooling fluid may be circulated is provided and is shown at 17.

The method will be described as applied to the sterilizing of peas. The ordinary method employed in cooking under steam pressure, food products which are not enclosed in cans or other containers, consists in introducing steam under pressure, usually under the surface of the material to be treated, venting air from the top of the pressure vessel, if necessary, until the desired temperatures and pressures are reached. This is maintained for the desired duration of treatment, depending upon the nature of the material under treatment. The steam pressure is then shut off and the material cooled, either by venting steam to the atmosphere, or by surface cooling in a separate piece of apparatus, or by the combination of both methods. Sometimes, the step of cooling is entirely omitted, and the heated material placed in containers under steam pressure, completing the cooling operation on the sealed container.

In the carrying out of the improved method, the cycle is quite different and includes added novel steps. The cycle illustrated in Figure 2 shows the successive steps which may be used as an illustration of the application of the invention to the sterilizing of peas. The pressures shown are absolute, hence the operations commence at a pressure of 14.7 pounds per square inch. In this illustrated example, the blanching step is performed by blanching with open steam for a period of three minutes at approximately 212° F., which appears in Figure 2 at 14.7 pounds per square inch absolute. For those who object to such high blanching temperatures, the blanching may be accomplished in conventional blanchers prior to charging the product into the vessel 1, or product may be blanched in the apparatus by hot water or steam below atmospheric pressure. The vents are then closed and steam quickly admitted to a much higher pressure. There is no limit to the rate at which steam may be introduced at this point, except the size of the steam supply, and the pressure may be raised from atmospheric to sixty pounds per square inch gauge pressure within two seconds; this sudden change appears to cause no damage to the peas. The pressure is permitted to remain at this high value only for a comparatively short time, depending upon the product under treatment. With peas, it is maintained at this pressure only about thirty seconds. Either higher or lower pressures may be employed, and longer periods of time used, as this high-pressure short time treatment is not per se, the essence of the invention. The time and temperature is, therefore, adjusted to get the best results for each product. At the completion of this heating and sterilizing step, a new step is introduced. Instead of maintaining or lowering the pressure effective on the product, it is raised to a higher degree. For example, assuming that the storage tank 9 is maintained under one hundred pounds pressure of nitrogen; obviously opening the valve 10 will equalize the storage tank and the pressure vessel 1. The valve is preferably of sufficient size so that this adjustment takes place very quickly. For example, in the cycle illustrated in Figure 2, the pressure rises from sixty pounds to eighty pounds within a time of one second. The atmosphere in the retort has now obviously been changed from nearly 100% steam to approximately 75% water vapor and 25% nitrogen by volume. Cooling water is now admitted to the coil 17, and the fan 5 operated to insure uniform cooling throughout the mass of peas. The steam will condense, but the reduction in pressure is less rapid than would be the case without the use of the counter-balancing pressure of nitrogen. Further, it is apparent that when the counter-balancing pressure is sufficient to offset the outward steam pressure due to the difference in temperature between the center of each pea and its outer surface, there can be no bursting of the pea skins from internal pressure at any cooling rate. While the above example shows an actual increase in pressure, under some conditions it will be understood that the gauge would not rise at all and might even drop somewhat during the application of counter pressure, since the gas introduced is in part replacing steam which disappears by condensing, hence it is possible to practice the process by introducing gas at the same rate as the steam condensation rate, or less, and have no rise in gauge pressure at all.

In the methods heretofore employed, it has not been feasible to control this tendency to rupture the skin of the peas, except by sealing the product in individual tin containers under steam pressure in a way that prevents very rapid cooling after the containers are sealed, or by introducing cold liquids into the product, this step involving mechanical difficulties which render it practicable for use only by tolerating some mechanical injury to the product under treatment, and being entirely impractical on a product such as peas, unless the mass of product handled at one time is very small.

In contradiction to such methods, the present method of sterilizing a food product does not require or use agitation of the product, or does not involve high-velocity flow of liquids at any point, and by the use of the counter-pressure step, it renders the rupture of the food particles by internal steam pressure during the cooling operation impossible.

After the product has been rendered sterile and cooled in the manner above described, it may be transferred by gravity in a closed system to another vessel, in which case it may be desirable to crack the valve 10 and permit a slight follow-up flow of sterile non-condensible gas into the vessel while the product is running out. It is not thought necessary to show the product outlet pipe, since the invention is not directed to mechanical details used either before or after the sterilizing operation, and any of the various types of apparatus known to those skilled in the art may be employed for placing the sterile product in a sterile container and sealing the same therein.

The blanching may be carried out at a much lower temperature, if desirable for the product being treated. In either case, the double-heating and extra handling involved in a separate blanching operation are avoided. Instead of using nitrogen, compressed air may be used in the tank 9, in case where oxygen is not objectionable to the product under treatment.

An advantage of the method described above is the retention of the soluble salts, and also the retention of volatile flavors. Since the cooling is accomplished only by condensation in a closed vessel from which oxygen is excluded, the liquid condensed during the cooling cycle may be collected and added to the canned product before sealing.

During the operation above described, the acidity or alkalinity of the material under treatment may be quite important. When a product, such as peas, is made neutral, or very nearly so, and held in a condition to favor good color retention, the skin is at the same time softened and made more susceptible to injury. In the case of more mature products, a premature increase in pH may result in sufficient shrinkage to split the skins and injure the product before sterilization has even commenced, much less been completed. On the other hand, when the peas have been permitted to pass through complete sterilization, either at their natural pH, or at a pH favorable to maximum resistance to injury, it is found that the color is readily destroyed and a brownish dull appearance may result. Means is provided in the apparatus as illustrated, for changing the pH of the material while it is being treated. This may be done by admitting small amounts of ammonia with the sterilizing steam, or with the counter-pressure air, according to the time in the operation where the increase in pH is desired.

A novel and useful situation may be created by reversing this, in case of peas, introducing an excess of ammonia over the amount desired before processing is commenced, for example, by the use of small amounts of alkali in the wash water. Then introducing small amounts of an acidic gas, such as carbon dioxide, with the sterilizing steam. In this manner, a condition is obtained during sterilization where the bulk of the contents of the peas remains at a higher pH, while the outer surfaces are maintained at a somewhat lower pH by the action of the carbon dioxide. In this manner, the interior of the product is maintained under conditions favorable for protection of color, while at the same time, the exterior is brought to a state which will protect the skin from excessive damage or softening. The ammonia gas or carbon dioxide gas admitted for the purpose of producing a controlled change of hydrogen ion concentration in the product is usually referred to as a buffer gas and is selectively used for the purpose of obtaining the desired pH for the product.

It is not to be supposed that the pH considered best for particular products, and representing a compromise among (1) the natural pH of the product itself; (2) optimum pH for sterilizing; (3) optimum pH for storage; (4) optimum pH from the point of view of container corrosion; (5) optimum pH for flavor in the finished product, will always remain a fixed quantity, since better results may be obtained by having three different pH conditions from the three steps of sterilizing, storing and consuming. By the improved method above described, the hydrogen ion concentration in the material under treatment may be controlled and varied during processing by the admission of basic or acidic gases under pressure, and thus a different pH condition created for sterilizing than that which is created for storing and consuming.

While the invention has been described as particularly adapted for the "high-short" sterilization of peas, it will be understood that it is equally applicable to diced vegetables, whole grain corn, and to any other food product. Neither is the invention limited to the specific cycle described above, but any cycle may be employed for blanching, sterilizing and cooling, and also any cycle may be employed for introducing acidic or basic gases which gives the best result on the particular food product under treatment.

Having thus described the invention, what I claim as new and desire to secure by Letters Patent, is—

1. The method of sterilizing food products in bulk consisting in enclosing the food product in a pressure vessel, eliminating air from the vessel, admitting steam at high temperature for a time sufficient to sterilize, forcing into the vessel after the sterilizing treatment has been effected, a gas non-condensible at atmospheric temperature, cooling the product by condensing the steam from the mixture of gas and steam within the vessel and transferring the sterile product to a sterile container in which it is to be sealed.

2. The method of sterilizing food products consisting in enclosing the food product in a container, admitting live steam thereto until the product is rendered sterile, then introducing a predetermined quantity of a gas which is non-condensible with the steam when the temperature is lowered below 212° F. and cooling the product to a safe temperature for removal from the container.

3. The method of sterilizing food products in bulk consisting in enclosing the product in a pressure vessel, admitting steam at a high temperature for a time sufficient to sterilize, forcing into the vessel after the sterilizing treatment has been effected, a gas non-condensible at atmospheric temperature and cooling the product by condensing the steam from the mixture of gas and steam within the vessel.

4. The method of sterilizing food products in bulk consisting in enclosing the food product in a pressure vessel, admitting steam to the vessel for sterilizing the food product and introducing a buffer gas into the sterilizing vessel during the treatment of the food product for the purpose of controlling the hydrogen ion concentration in the material undergoing treatment, forcing into the vessel a gas non-condensible at atmospheric temperature, cooling the product by condensing the steam from the mixture of gas and steam within the vessel, and transferring the sterile product to a sterile container in which it is sealed.

5. The method of sterilizing discrete particle food products consisting in enclosing the food product in a pressure vessel, treating with relatively high pressure steam for a relatively short time, introducing a gas non-condensible at atmospheric temperature into the vessel after treating with a high pressure steam, closing off the sterilizing vessel and cooling by condensing steam present in the vessel and that evolved by the cooling product.

6. The method of sterilizing discrete particle food products consisting in enclosing the food product in a pressure vessel, evacuating the vessel, admitting steam under low pressure for an initial period of blanching, then admitting steam under relatively high pressure for a relatively short time to sterilize the product, subsequently admitting a counter-balancing pressure of a gas non-condensible at atmospheric temperature to the vessel, then closing off the vessel and cooling by internal forced circulation of steam and gases over a cooling surface.

7. The method of sterilizing discrete particle foods in bulk which includes controlling the sterilizing temperature by means of a controlled steam pressure, controlling the hydrogen ion concentration of the product during treatment by admission of a buffer gas under pressure, and preventing mechanical injury to the particles by introducing a predetermined amount of a gas non-condensible at atmospheric temperature after the sterilizing treatment has been effected and before pressure on the product is reduced.

CHARLES L. JONES.